United States Patent [19]
Ikeda et al.

[11] Patent Number: 6,011,261
[45] Date of Patent: Jan. 4, 2000

[54] PROBE FORMED OF MONO-CRYSTALLINE SI, THE MANUFACTURING METHOD THEREOF, AND AN INFORMATION PROCESSING DEVICE USING THE PROBE

[75] Inventors: Tsutomu Ikeda, Hachioji; Takayuki Yagi, Yokohama; Yasuhiro Shimada, Hadano; Takeo Yamazaki, Yokohama, all of Japan

[73] Assignee: Canon Kabushiki Kaisha, Toyko, Japan

[21] Appl. No.: 09/034,227

[22] Filed: Mar. 4, 1998

[30] Foreign Application Priority Data

Mar. 4, 1997 [JP] Japan ................................ 9-065472

[51] Int. Cl.⁷ .............................. G01B 5/28; G01C 7/00; H01J 37/26; H01L 21/306
[52] U.S. Cl. ............................ 250/306; 73/105; 216/11
[58] Field of Search .............................. 250/306; 73/105; 216/11

[56] References Cited

U.S. PATENT DOCUMENTS

| | | | |
|---|---|---|---|
| 4,943,719 | 7/1990 | Akamine et al. | 250/306 |
| 5,021,364 | 6/1991 | Akamine et al. | 250/306 |
| 5,221,415 | 6/1993 | Albrecht et al. | 156/629 |
| 5,811,017 | 9/1998 | Matsuyama | 216/11 |
| 5,883,387 | 3/1999 | Matsuyama et al. | 250/306 |

FOREIGN PATENT DOCUMENTS 4-321955A 11/1992 Japan.

OTHER PUBLICATIONS

C.A. Spindt, et al., "Physical Properties of Thin–film Field Emission Cathodes with Molybdenum Cones", Journal of Applied Physics, 1976, No. 12, pp. 5248–5263.

O. Wolter, et al., "Micromachined Silicon Sensors for Scanning Force Microscopy", American Vacuum Society, 1991, pp. 1353–1357.

*Primary Examiner*—Jack I. Berman
*Attorney, Agent, or Firm*—Fitzpatrick, Cella, Harper & Scinto

[57] ABSTRACT

A probe for detecting minute physical behavior comprises a lever member, particularly in the form of a cantilever, formed of a monocrystalline silicon layer and a tip in the form of one-end-supported beam which is bowed and formed upon the lever member. The probe is manufactured by forming a film of a material with low density and high elasticity on the silicon layer of an SOI substrate, then oxidizing part of the silicon layer and removing the oxidized portion to form a tip with the material as a so-called bird's beak, and finally the SOI substrate is worked to form the cantilever shape of the lever member. The probe can be used for an information recording/reproducing device with good traceability even in high speed scanning over a recording medium.

13 Claims, 4 Drawing Sheets

PROBE FORMED OF MONO-CRYSTALLINE SI, THE MANUFACTURING METHOD THEREOF, AND AN INFORMATION PROCESSING DEVICE USING THE PROBE

BACKGROUND OF THE INVENTION

1. Field of the Invention

The present invention relates to a probe to be used for scanning probe microscopes, the manufacturing method thereof, and an information processing device using the probe.

2. Related Background Art

There are surface microscopes having space resolution on an atomic scale in practical use such as scanning tunneling microscopes (hereafter referred to as "STM") and scanning atomic force microscopes (hereafter referred to as "AFM"), such surface microscopes being collectively referred to as scanning probe microscopes (hereafter referred to as "SPM").

Regarding such SPMs, an information recording/reproducing device which writes recording information to a local area is being considered, making application of the fact that the tip is capable of accessing the surface of a sample at the atomic level.

With the STM, a tunnel current is detected between a biased electroconductive tip and an electroconductive sample with the distance therebetween being within several Angstroms, the tip is scanned while the distance between the tip and sample is controlled so as to be maintained at a constant in order to make the tunneling current constant, and a surface image is formed by imaging the tunnel current or feedback control signals. Examples of recording methods applying the STM include a method wherein electric voltage is applied between the tip and recording medium and a change in format of the surface of the recording medium is brought about locally, or a method wherein the electroconductivity of the recording medium is changed.

On the other hand AFMs detect the atomic force operating upon the tip and sample surface at the time that the tip is brought within several Angstroms of the sample, and the tip is scanned in two-dimensional planar fashion, thus obtaining a surface image including three-dimensional information.

As for the means for detecting atomic force, an elastic lever of which one end is fixed and the tip is held near the free end is employed.

As for a multi-functional microscope for making AFM and STM observation with a single apparatus, there is a multiplex atomic force microscope/scanning tunneling microscope (AFM/STM).

According to this arrangement, the probe used for the AFM is comprised of a cantilever and a tip held by the cantilever, detecting the current between the tip and sample by making the tip to be electroconductive.

With a normal method of usage, bias is applied between the tip and sample at the time that the AFM is operating and the current is detected, thereby obtaining a three-dimensional surface image and tunneling current distribution image simultaneously with a single tip.

Regarding this multiplex apparatus as well, an information recording/reproducing device which writes recording information to a local area is being considered, making application of the fact that the tip is capable of accessing the surface of a sample at the atomic level. In such a case, a plurality of probes are used in order to increase the writing or reading speed (Japanese Patent Application Laid-Open No. 4-321955).

The conventional method for manufacturing probes (U.S. Pat. No. 5,221,415) involves first performing anisotropic etching by crystal axis of a mono-crystalline Si substrate 402 upon which a Si dioxide layer 401 has been formed as shown in FIGS. 1A to 1G, forming an inverse pyramid recess 403 (FIG. 1A).

After forming the recess 403, the Si dioxide layer 401 is removed. While this recess 403 is used as a mold for the tip, the entire surface is then coated with a silicon nitride layer 404 (FIG. 1B), patterning is performed in the form of the cantilever 405 (FIG. 1C), a glass plate 408 provided with a saw-cut groove 406 and Cr layer 407 is brought into contact with the silicon nitride layer 404 (FIG. 1D), part of the glass plate 408 is ruptured so as to form a mounting block 408a (FIG. 1E), and the mono-crystalline Si substrate 402 is etched away to obtain a cantilever-shaped probe 409 (FIG. 1F). Finally, a metal layer 410 which serves as the reflecting film for the optical lever type AFM is formed (FIG. 1G).

Also, regarding the method of forming the tip, there are a method such as shown in FIG. 2A wherein a thin-film layer is patterned on the substrate in the form of a circle, which is used as a mask for etching the Si substrate 502, thereby obtaining a tip 503 by side-etching (O. Wolter, et. al, "Micromachined silicon sensors for scanning force microscopy", J. Vac. Sci. Technol. B9(2) Mar/Apr, 1991, pp 1353–1357), a method wherein as shown in FIG. 2B a reverse-tapered opening 504a is formed in resist 504 and vapor-deposition of electroconductive material 505 is performed thereto from an angle while rotating the substrate 506, thereby forming a tip 503 by lifting off (C. A. Spindt, et. al., "Physical properties of thin film field-emission cathode with molybdenum cones", J. Appl. Phys., 47. 1976, pp 5248–5263), and so forth.

However, the examples shown in FIGS. 1A to 1G and 2A and 2B have the following problems:

First, regarding the lever:

Film of $SiO_2$, SiN, SiC, C, etc., formed by vacuum deposition or CVD are polycrystalline or amorphous, and have internal stress to a certain extent, resulting in the problem of the lever itself bowing.

In the case that a portion of a thin-film lever of material such as $SiO_2$ or SiN is held by a thick substrate such as a Si substrate, stress is generated at the layered portions thereof, and this stress is particularly centralized on the base portion where the lever is attached, so repeated operation of the lever can lead to destruction from that portion.

In the event that the cantilever-shaped probe is coated with metal film or the like to provide it with light-reflecting or electroconductive properties, such a phenomenon occurs that stress is generated between the cantilever and metal film, causing the cantilever to bow.

In the event that the cantilever bows toward the tip, or in the event that the tip of the cantilever bows in the reverse, the center of the cantilever may come into contact with the sample or recording medium.

Further, in the event that a plurality of probes are used, a particular problem is irregularity in the bowing thereof. That is, in the event of using an information processing device using the AFM/STM principles, when a plurality of probes on a single plane are to be brought into simultaneous contact with a recording medium, the load of each probe on the recording medium differs if there is irregularities in the levers, causing problems such as deterioration of resolution or destruction of the recording medium or tip, depending on the load.

Also, regarding the tip:

In the case that a cantilever-shaped probe is coated with electroconductive material to form an STM probe, the pointed end of the tip is not easily coated due to the sharp form thereof, and it is difficult to obtain stable properties with STM which handles tunneling current which is a very weak current.

With such tips shown in FIG. 2A and FIG. 2B, it is difficult to make constant the resist patterning conditions or the material etching conditions at the time of forming the tip, meaning that it is difficult to accurately maintain the form of the plurality of tips being formed, i.e., the height and end curvature radius thereof, and the tip becomes heavy due to being formed completely of metal, thus exhibiting a problem of decrease in resonance frequency.

SUMMARY OF THE INVENTION

Accordingly, it is an object of the present invention to solve the above problems of the known art, and to provide a probe adapted for higher speed information recording, the manufacturing method thereof, and an information processing device using the probe, comprising a tip which is light and is capable of following three-dimensional properties of the medium, wherein bowing of the cantilever owing to wiring can be prevented and information recording of even higher speeds can be achieved.

The above object is achieved by a probe for detecting minute physical behavior, comprising: a lever member formed of a mono-crystalline Si substrate; and a tip in the form of one-end-supported beam which is bowed and formed upon the lever member.

Also, the above object is achieved by a method for manufacturing a probe for detecting minute physical behavior, comprising the following steps: a step for forming a film of a material with low density and high elasticity on an Si layer of an SOI substrate; a step for oxidizing part of the Si; a step for removing the oxidized portion and forming a tip; and a step for working the SOI substrate and forming a lever member supporting the tip.

Further, the above object is achieved by an information recording/reproducing device which uses a probe to perform recording and/or reproducing of information to and/or from a recording medium, the information recording/reproducing device comprising: the above-mentioned probe; and means for applying voltage between the probe and recording medium facing the probe, and performing recording and/or reproducing of information.

These will be described in detail in the following embodiments.

DESCRIPTION OF THE PREFERRED EMBODIMENTS

The probe according to the present invention is capable of using the cantilever itself formed of Si mono-crystal as the tunneling current extracting wiring, so there is no bowing of the lever due to wiring.

Also, since the tunneling current extracting from the cantilever is performed using wiring, so the electrode size can be reduced as compared to probes wherein the cantilever and all of the substrate surface supporting the cantilever are coated with electroconductive material. Accordingly, in the event that recording of information is to be performed by applying voltage to the recording medium, the amount of floating capacitance occurring between the probe and the recording medium can be decreased, thereby reducing the time for applying voltage. That is, information recording can be carried out at higher speeds.

Also, the tip volume can be maintained small since the tip is of a form of a beam which is supported on one end, and the weight of the tip can be sufficiently reduced, since it is of a structure wherein highly elastic material which is of lower density than metal is coated with an electroconductive thin film. Accordingly, the reduction in resonance frequency of the cantilever due to tip formation can be suppressed.

Further, since the tip has a beam structure supported on one end which is extremely small as compared to the cantilever, three-dimensional-properties of the medium which cannot be followed with the cantilever alone can thus be followed.

Next, the details of the present invention will be described more specifically, with reference to the drawings.

Figure 1A:
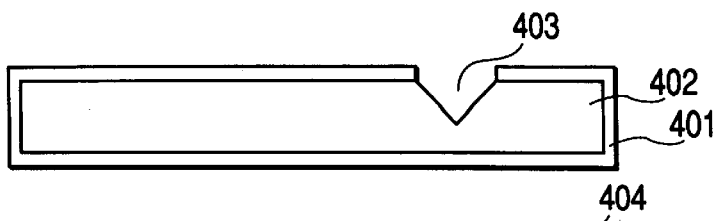
FIGS. 1A, 1B, 1C, 1D, 1E, 1F, and 1G are diagrams showing a known manufacturing process for probes.
Figure 1B:
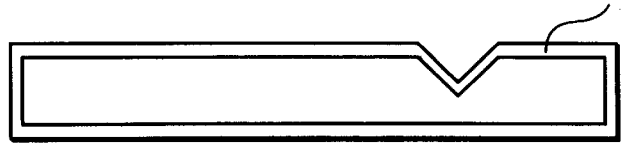
Figure 1C:
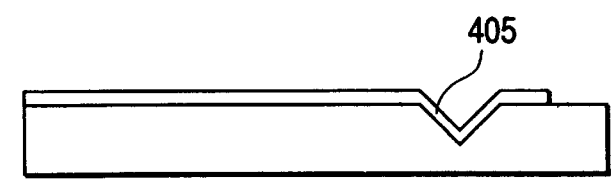
Figure 1D:
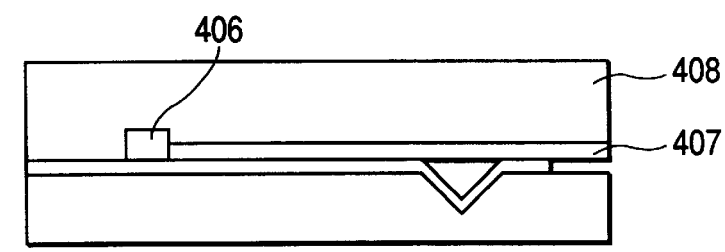
Figure 1E:
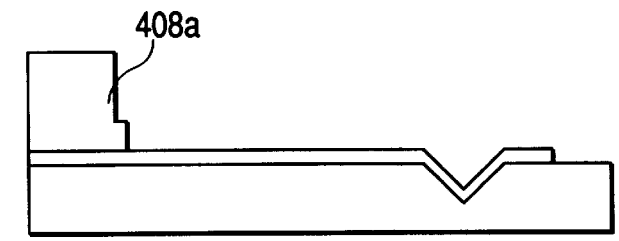
Figure 1F:
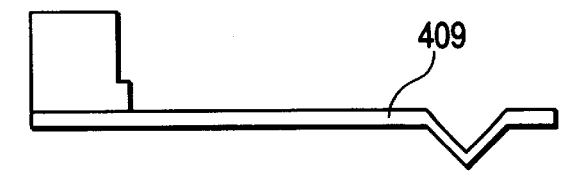
Figure 1G:
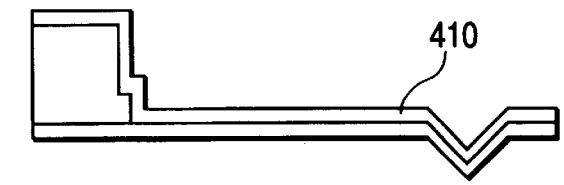
Figure 2A:
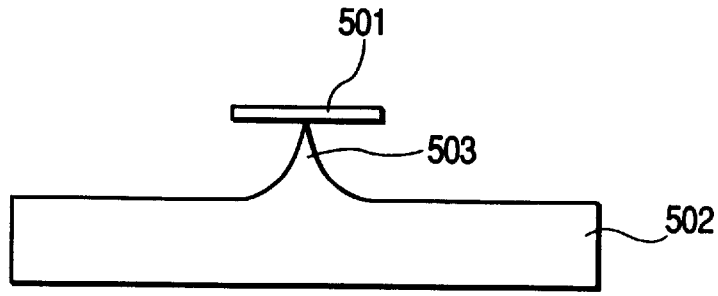
FIGS. 2A and 2B are diagrams showing a known manufacturing process for tips.
Figure 2B:
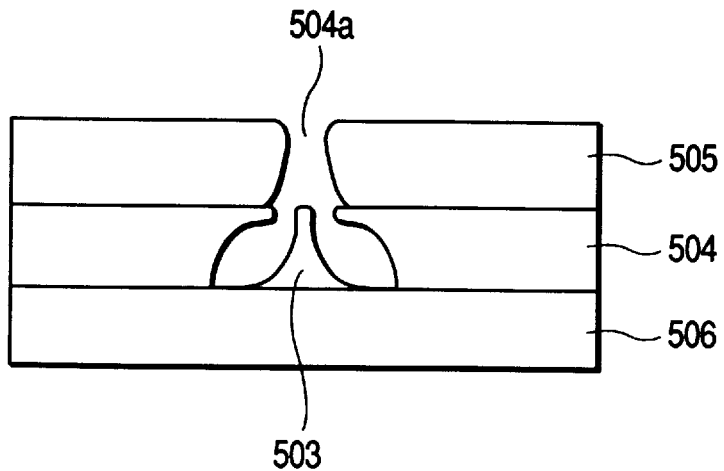
Figure 3:
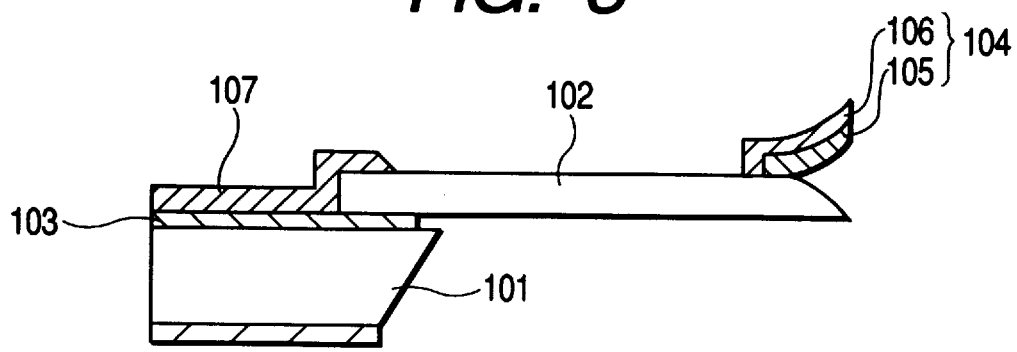
FIG. 3 is a diagram illustrating a cross-sectional view of the probe according to the present invention.

FIG. 3 is a cross-sectional diagram of the probe according to the present invention. The first mono-crystal Si 101 and the cantilever 102 formed of a second mono-crystalline Si layer are provided via an insulating layer 103. The second mono-crystalline Si layer 102 making up the cantilever 102 is doped with impurities for extracting the tunneling current.

The resistance desirably is 0.01 Ω·cm or lower. Also, the thickness thereof is determined by the desired spring constant of the cantilever, along with the cantilever shape, but generally is from 0.1 μm to several μm.

There are no particular restrictions on the thickness of the insulating layer 103, but generally is around 0.1 to 1.0 μm. Formed on the end of the cantilever 102 is a tip 104 having the form of a beam which is supported on one end and protruding upwards from the cantilever 102, i.e., a bird's-beak form. The tip 104 is formed of a highly resilient material 105 such as silicon nitride or silicon carbide coated with an electroconducting film 106.

As for the electroconducting thin film, material with a melting point of 1,000° C. or higher, such as Pt, Au, W, Ta, or the like is used.

The electroconducting thin-film 106 and the cantilever 102 are electrically connected. Also, wiring 107 is formed on the other end of the cantilever 102.

The thickness of the film of the highly elastic material 105 used here should be that which enables tip formation, and generally is 0.1 μm to 1.0 μm. The thickness of the electroconducting thin film 106 is around 20 to 50 nm.

Next, an embodiment of the present invention will be described with reference to the FIGS. 4A to 4G.

First Embodiment

Figure 4A:
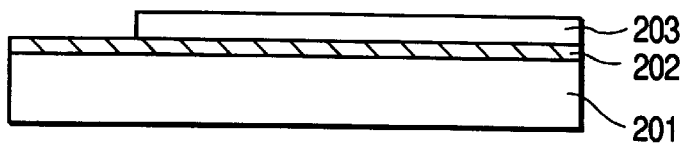
FIGS. 4A, 4B, 4C, 4D, 4E, 4F, and 4G are diagrams showing the manufacturing process according to the present invention.
Figure 4B:
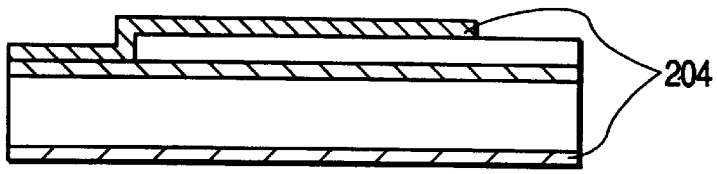

A SOI (silicon on insulator) substrate was provided, this being formed of a Si substrate 201 with crystal orientation face of (100) receiving formation of a Si dioxide film 202 of 0.5 μm thickness and an Si mono-crystalline layer 203 of 0.5 μm thickness. The Si mono-crystalline layer 203 with resistance of 0.001 Ω·cm or lower was subjected to patterning by dry etching using photolithography and $SF_6$ gas, thereby forming a lever pattern 203 (FIG. 4A). A silicon nitride (SiN) film 204 of 0.2 μm in thickness was formed to the entire surface of this substrate using LP-CVD (low pressure chemical vapor deposition), following which the SiN film at the end portion of the lever pattern 203 was removed (FIG. 4B).

Figure 4C:
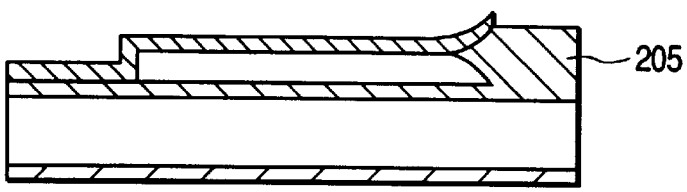
Figure 4D:
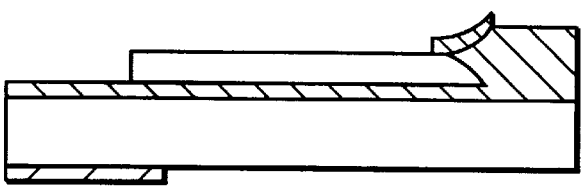

Next, the substrate was subjected to heat-oxidizing, oxidizing 205 the exposed Si portion (FIG. 4C). Next, the SiN film 204 on the front and rear of the substrate was patterned, thus forming pattern for tip formation and anisotropic etching (FIG. 4D).

Figure 4E:
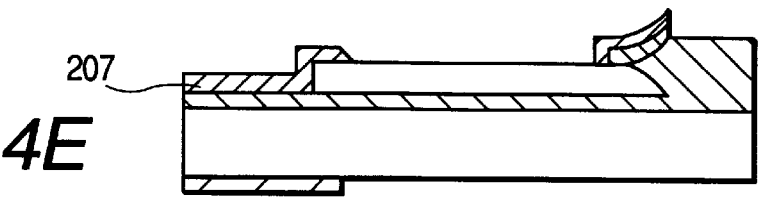
Figure 4F:
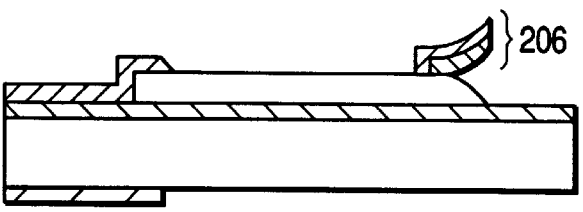

Next, vapor deposition of a Pt layer was performed to the SiN remaining on the lever pattern and the neighboring Si portion and also the end of the lever pattern 203, thus forming the electroconducting tip 206 and electrode wiring 207 for extracting the tunneling current (FIG. 4E).

Next, the substrate was submerged in buffer fluorine whereby the great portion of the exposed silicon dioxide layer 205 is dissolved and removed (FIG. 4F), following which a polyimide layer of 5 μm thick was formed on the substrate lever pattern 203 and tip 206 as a protective layer.

Figure 4G:
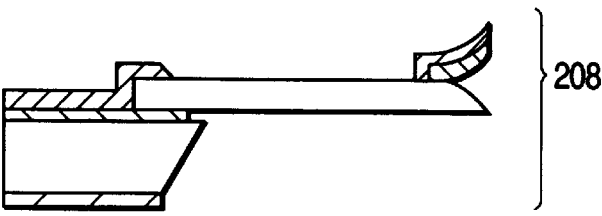

Next, the rear side of the substrate was submerged in potassium hydroxide and anisotropic etching by crystal axis is performed following which the exposed Si dioxide film 202 was dissolved and removed using BHF solution, and further, oxygen plasma processing was performed to remove the polyimide layer, thereby obtaining the probe 208 according to the present invention (FIG. 4G).

With the present embodiment, nine rectangular probes of 50 μm in length and 5 μm in width were formed on the same substrate, but measurement using a scanning laser microscope (manufactured by LASER TECH) revealed sideways and longways bowing in none of the manufactured probes. Also, the height of the tip having the form of a beam which is supported on one end was between 0.50 to 0.58 μm.

Next, a polished Si mono-crystal {111} surface was scanned at a scanning speed of 2 mm/sec over a square area of 10 μm by 10 μm, by an AFM/STM device using the probe 208 of this embodiment, and excellent surface information was obtained with good reproducability.

Second Embodiment

A SOI (silicon on insulator) substrate was provided, this being formed of a Si substrate 201 with crystal orientation face of (100) receiving formation of a Si dioxide film 202 of 0.3 μm thickness and an Si mono-crystalline layer 203 of 0.3 μm thickness.

The Si mono-crystalline layer 203 had resistance of 0.005 Ω·cm or lower. Probes formed of the Si mono-crystal were formed following the same process as with the First Embodiment.

Now, the thickness of the SiN film 204 was made to be 0.1 μm in thickness, and W was used for the wiring and electroconductive thin film coating material.

With the present embodiment, nine rectangular probes 25 μm in length and 4 μm in width were formed on the same substrate, but measurement using a scanning laser microscope (manufactured by LASER TECH) revealed sideways and longways bowing in none of the manufactured probes. Also, the height of the tip having the form of a beam which is supported on one end was between 0.2 to 0.21 μm.

Next, a polished Si mono-crystal {111} surface was scanned at a scanning speed of 2 mm/sec over a square area of 10 μm by 10 μm, by an AFM/STM device using the probe 208 according to the present invention, and excellent surface information was obtained with good reproducability.

Third Embodiment

Figure 5:
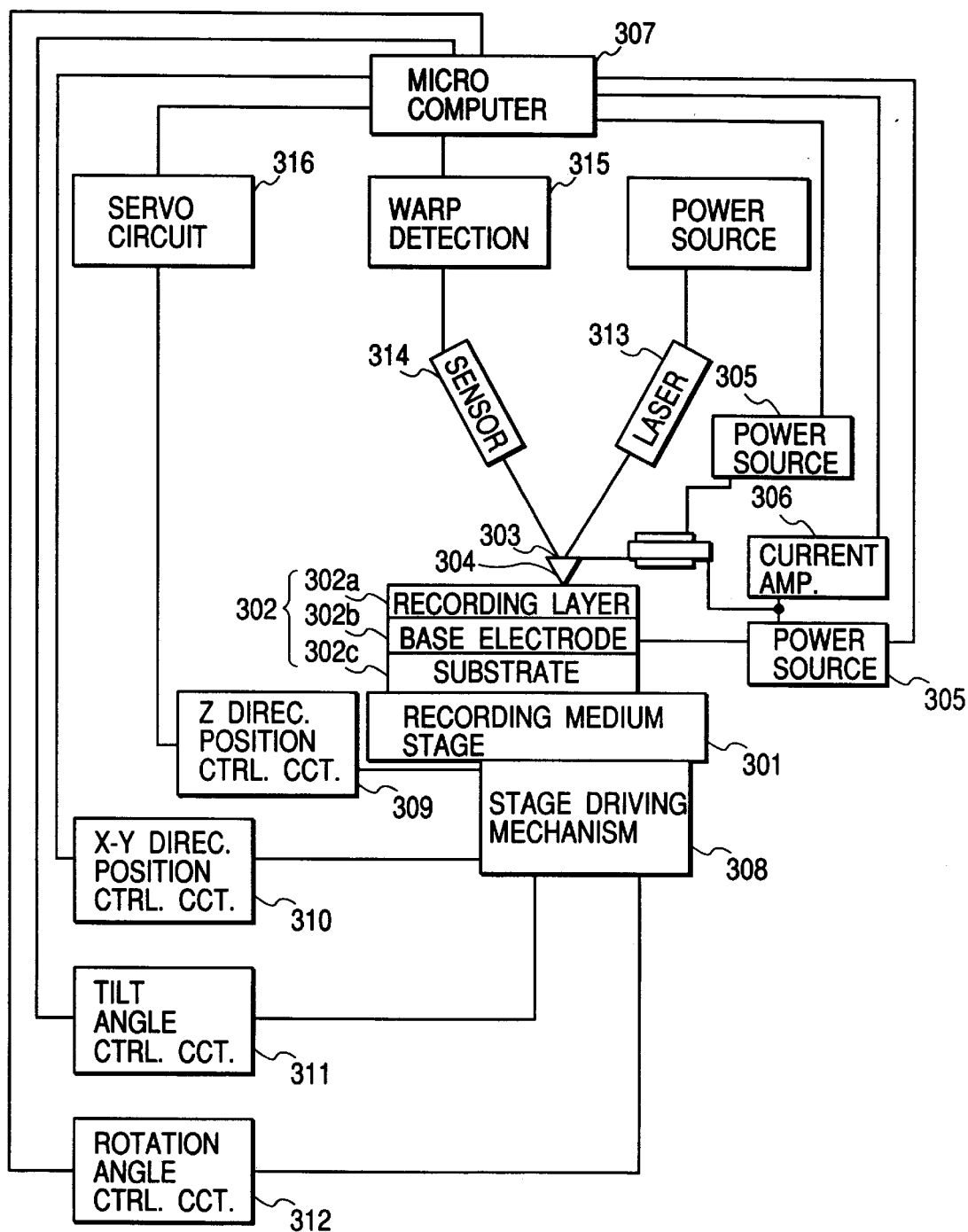
FIG. 5 is a diagram schematically illustrating the information processing device (information recording/reproducing device) according to the present invention.

Description will be made regarding an information recording/reproducing device using the probe manufactured in the same manner as the First Embodiment. FIG. 5 shows the principal components of the device and a block diagram.

Description will now be made with reference to the Figure. A probe 303 was positioned facing recording medium 302 on a recording medium stage 301.

302a denotes an information recording layer, and the base electrode 302b is for applying voltage to the information recording layer 302a.

302c denotes a substrate. The information recording layer 302a is formed of an organic thin-film which undergoes a change in electrical nature due to the tunnel current generated between the information recording layer 302a and the tip 304 (the electrical memory effect).

305 denotes an electrical power source and 306 denotes an electrical current amplifier, these being connected to a micro computer 307 and used for recording and reproducing of information to and from the recording medium 302.

A recording medium stage 301 on a recording medium stage driving mechanism 308 is controlled by a Z-direction position control circuit 309, an X-Y direction position control circuit 310, a tilt angle control circuit 311 and a rotation angle control circuit 312, these being controlled by the micro computer 307. Laser 313 is irradiated to the end of the probe 303, the reflected light thereof is received by a two-way splitting sensor 314, and the warping of the probe 303 is detected by a warping amount detecting device 315.

This information is sent to the micro computer 307 and a servo circuit 316.

The recording medium 302 used in the embodiment was manufactured by vapor deposition of 30 nm of Au onto a base electrode 302b formed on a quartz glass substrate 302c, following which a polyimide layer (information recording layer 302a) is formed thereupon by LB (Langmuir-Blodgett's technique).

The probe 303 formed in the First Embodiment was set to the above-described recording/reproducing apparatus, and recording/reproducing was performed according to principles and methods disclosed in Japanese Patent Application Laid-Open No. 63-161552. First, regarding observation of the recording medium 302 with the above-described probes 303, good AFM images were obtained with all of the probes. Next, voltage was applied in pulses between the tip 304 and the base electrode 302b while scanning the recording medium 302 using the recording medium stage 301. The applied voltage was rectangular wave pulses of 8V. After applying the pulses, the recording medium was scanned at 1V voltage, and it was found that the information recording layer 302a underwent a property change at the points of pulse application, creating areas with low electrical resistance. The areas with low electrical resistance, i.e., the recording bits had an area of around 10 nm. The recording and reproduction was successfully performed with all of the probes 303.

As described above, regarding the present invention, the cantilever itself formed of an Si mono-crystal can be used as wiring for extracting tunneling current, so there is no bowing of the cantilever owing to coating the cantilever with metal or the like for extracting current, meaning that a probe, the manufacturing method thereof, and an information processing device using the probe can be provided, wherein image processing can be performed at high resolution, and destruction of the recording medium and the tip can be prevented.

Also, with the probe according to the present invention, extraction of tunneling current can be performed by wiring provided to one end of the cantilever, so the electrode area can be reduced as compared to probes wherein the cantilever and the entire substrate supporting the cantilever are coated with electroconductive material, thus reducing the amount of floating capacity between the probe and the recording medium when recording information while applying voltage to the recording medium with an information processing device having this probe, consequently reducing the voltage application time and enabling information recording at higher speeds.

Also, with the probe according to the present invention, the tip volume can be maintained small since the tip is of a form of a beam which is supported on one end, and since the tip itself is of a form of an extremely small beam which is supported on one end, three-dimensional properties of the medium which cannot be followed with the cantilever alone can thus be followed.

Further, the weight of the tip can be sufficiently reduced, since it is of a structure wherein highly elastic material such as silicon nitride which is of lower density than metal is coated with an electroconductive thin film, thereby maintaining the resonance frequency of the cantilever at a high level.

What is claimed is:

1. A probe for detecting minute physical behavior, comprising:
   a lever member formed of a mono-crystalline Si layer; and
   a tip in the form of one-end-supported beam which is bowed and formed upon said lever member.

2. The probe according to claim 1, wherein said tip is either formed of electroconductive material, or is coated with electroconductive material.

3. The probe according to claim 2, wherein said electroconductive material coating is coated onto a material with lower density and higher elasticity than said electroconductive material.

4. The probe according to claim 3, wherein said material with lower density and higher elasticity is silicon nitride or carbon nitride.

5. The probe according to claim 2, wherein said electroconductive material is a material which has a melting point of 1,000° C. or higher.

6. The probe according to claim 1, wherein said mono-crystalline Si layer is 0.01 Ω·cm or lower in resistance.

7. The probe according to claim 1, wherein wiring is formed to the edge of said cantilever.

8. The probe according to claim 1, wherein said lever member is a cantilever.

9. An information recording/reproducing device which uses a probe to perform recording and/or reproducing of information to and/or from a recording medium, said information recording/reproducing device comprising:
   the probe according to any of the claims 1 through 6; and
   means for applying voltage between said probe and recording medium facing said probe, and performing recording and/or reproducing of information.

10. A method for manufacturing a probe for detecting minute physical behavior, comprising the following steps:
    a step for forming a film of a material with low density and high elasticity on an Si layer of an SOI substrate;
    a step for oxidizing part of said Si;
    a step for removing said oxidized portion and forming a tip; and
    a step for working said SOI substrate and forming a lever member supporting said tip.

11. The method according to claim 10, wherein said oxidization is heat-oxidizing.

12. The method according to claim 10, wherein said lever member is a cantilever.

13. The method according to claim 10, wherein said material with lower density and higher elasticity is silicon nitride or carbon nitride.

* * * * *

UNITED STATES PATENT AND TRADEMARK OFFICE
CERTIFICATE OF CORRECTION

PATENT NO.  : 6,011,261

DATED       : January 4, 2000

INVENTOR(S) : Ikeda et al

It is certified that error appears in the above-identified patent and that said Letters Patent is hereby corrected as shown below:

On the Title Page:

[57] In the Abstract:
    Line 10, "beak, and finally" should read
    --beak. Finally--.

COLUMN 1

Line 14, "practical" should be deleted;
    Line 16, "AFM")," should read --"AFM").--;
    Line 17, "such" should read --Such--; and "being"
    should read --are--;
    Line 22, "making application of" should read
    --applying--;
    Line 28, "Angstroms, the" should --Angstroms. The--;
    Line 29, "so as" should be deleted;
    Line 30, "constant, and" should read --constant.--; and
    Line 31, "a" should read --A--.

COLUMN 2

Line 19, "Also, regarding the method of forming" should
    read --To form--; and "are" should read --is--;
    Line 20, "such" should be deleted;
    Line 26 "1353-1357), a" should read --1353-1357.
    Another--; and "wherein as" should read --is--; and
    "2B" should read --2B where--; and
    Line 65, "is" should read --are--.

UNITED STATES PATENT AND TRADEMARK OFFICE
CERTIFICATE OF CORRECTION

PATENT NO. : 6,011,261
DATED : January 4, 2000
INVENTOR(S) : IKEDA ET AL.

It is certified that error appears in the above-identified patent and that said Letters Patent is hereby corrected as shown below:

COLUMN 3

Line 4, "the" (second occurrence) should read --its--;
    Line 5, "form thereof," should read --form,--;
    Line 6, "current" should read --current,--; and
    Line 38, "an" (both occurrences) should read --a--.

COLUMN 4

Line 18, "maintained" should read --kept--;
    Line 19, "of a form of" should be deleted; and --end, and" should read --end.--;
    Line 20, "the" should read --The--; and
    Line 44, "is" should read --it is--.

COLUMN 5

Line 15, "pattern" should read --a pattern--;
    Line 22, "buffer" should read --buffered--;
    Line 23, "the" should read --a--;
    Line 24, "(FIG. 4F), following" should read --(FIG. 4F).--;
    Line 25, "which a" should --Next, a--;
    Line 38, "longways" should read --lengthwise--;
    Line 45, "reproducability" should read --reproducibility--; and
    Line 55, "First" should read --first--;
    Line 56, "Embodiment" should read --embodiment--;

UNITED STATES PATENT AND TRADEMARK OFFICE
CERTIFICATE OF CORRECTION

PATENT NO.     : 6,011,261

DATED          : January 4, 2000

INVENTOR(S)    : IKEDA ET AL.

It is certified that error appears in the above-identified patent and that said Letters Patent is hereby corrected as shown below:

COLUMN 5 (Contd.,)

Line 58, "$\mu$m in thickness," should read --$\mu$m,--; and
Line 65, "longways" should read lengthwise--.

COLUMN 6

Line 5, "reproducability" should read --reproducibility;
Line 10, "First Embodiment" should read --first embodiment--;
Line 45, "First Embodiment" should read --first embodiment--; and
Line 66, "an" should read --a--.

COLUMN 7

Line 2, "current, meaning that" should read --current. Thus--;
Line 12, "material," should read --material.--; and "thus reducing" should read --Thus--;
Line 16, "probe," should read --probe is reduced,--;
Line 20, "of a" should read --in the--; and
Line 22, "of a" should read --in the--.

UNITED STATES PATENT AND TRADEMARK OFFICE
CERTIFICATE OF CORRECTION

PATENT NO. : 6,011,261
DATED : January 4, 2000
INVENTOR(S) : IKEDA ET AL.

It is certified that error appears in the above-identified patent and that said Letters Patent is hereby corrected as shown below:

<u>COLUMN 8</u>

Line 27, "an" should read --a--; and
Line 21, "and" should read --and the--.

Signed and Sealed this

Twenty-seventh Day of March, 2001

*Attest:*

NICHOLAS P. GODICI

*Attesting Officer*   Acting Director of the United States Patent and Trademark Office